US000001156H

United States Statutory Invention Registration [19]

[11] Reg. Number: H1156

Siegfried, II

[43] Published: Mar. 2, 1993

[54] DOWNHOLE FRACTURE DETECTION AND CHARACTERIZATION

[76] Inventor: Robert W. Siegfried, II, 6 Creekwood Cir., Richardson, Tex. 75080

[21] Appl. No.: 796,515

[22] Filed: Nov. 21, 1991

[51] Int. Cl.[5] ..... G01V 1/40

[52] U.S. Cl. ..... 367/31; 367/35; 367/75; 181/102; 181/105

[58] Field of Search ..... 367/25, 27, 31, 35, 367/75, 911; 181/102, 105; 73/152

[56] References Cited

U.S. PATENT DOCUMENTS

| | | | |
|---|---|---|---|
| 3,205,941 | 9/1965 | Walker | 367/35 |
| 4,282,587 | 8/1981 | Silverman | 367/37 |
| 4,432,078 | 2/1984 | Silverman | 367/37 |
| 4,713,968 | 12/1987 | Yale | 73/594 |
| 4,794,572 | 12/1988 | Sandergeld et al. | 367/31 |
| 5,010,527 | 4/1991 | Mahrer | 367/35 |

OTHER PUBLICATIONS

Wittrisch et al, SPWLA 28th Ann. Log. Symp., Jun. 29–Jul. 2, 1987, pp. 1-14.

Sarda et al, Oil & Gas Journal Apr. 6, 1987, pp. 40, 41, 44 & 46.

Siegfried et al, Jour. of Geophysical Research, Mar. 10, 1988, vol. 83, No. B3, pp. 1269–1277.

*Primary Examiner*—Bernarr E. Gregory

*Attorney, Agent, or Firm*—Albert C. Metrailer

[57] ABSTRACT

In the present invention, characteristics of fractures or microcracks in earth formations surrounding a borehole are detected by use of conventional sonic logging devices used in combination with internal variations of wellborne pressure. A sonic logging tool is first used to generate a log of acoustic velocity at a first pressure. Borehole pressure is then changed and a second log is obtained. Significant changes in formation velocity in response to the pressure change indicates the presence of fractures.

6 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

DOWNHOLE FRACTURE DETECTION AND CHARACTERIZATION

BACKGROUND OF THE INVENTION

The present invention relates to borehole logging methods for detecting and characterizing fractures in earth formations and more particularly to a method wherein borehole pressure is intentionally changed between measurements of sonic velocity in order to detect and characterize the presence of formation fracturing.

In many cases, the presence of fractures, either natural or induced, is an important feature governing the production of fluids from a subsurface reservoir. Knowledge of the extent of fracturing and fracture orientation is necessary to plan and evaluate completion, production and stimulation operations. Techniques currently available for characterizing fractures in the vicinity of a borehole involve either core analysis or logging measurements. Collection of core samples is expensive and may not provide the desired information. For example, important large scale fractures may not be sampled in the recovered core. Fractures present in core samples may have been induced by the coring process or by the stress relief associated with bringing a core to the surface. Well logging techniques to identify fractures include high resolution borehole imaging, for example, the borehole televiewer, low resolution borehole imaging, such as circumferential acoustic measurements and dipmeter, and sonic waveform analysis. The various borehole imaging techniques provide only information regarding the zone within about one inch of the borehole wall and do not always distinguish high permeability fractures from features with low permeability. Sonic waveform analysis involves the detection of attenuation or reflection of sound waves from fractures. This technique is most useful for fractures oriented normal to the borehole axis, which prevents effective detection of vertical fractures from vertical wells. In addition, none of these techniques is sensitive to microfractures, which may have apertures of 0.1 mm or less.

SUMMARY OF THE INVENTION

In the present invention, conventional acoustic logging tools are used to measure one or more acoustic properties, such as sonic velocity, of earth formations surrounding a wellbore while the pressure within the wellbore is varied. That is, multiple measurements are made with pressure changes being made between measurements. The variation of wellbore pressure causes a variation of the effective stress in the formation being examined for fractures. In formations containing fractures, acoustic properties, such as sonic velocity, are generally a strong function of effective stress. Preferably, both compressional sonic logging tools and shear wave tools using different orientations and polarizations are employed in order to obtain an indication of fracture orientation.

BRIEF DESCRIPTION OF THE DRAWINGS

The present invention may be better understood by reading the following detailed description of the preferred embodiments with reference to the accompanying drawings wherein.

DESCRIPTION OF THE PREFERRED EMBODIMENTS

The present invention is based on the principle that acoustic properties of the rock forming earth formations are strongly affected by the intensity or concentration of fractures or microcracks in the rock. For example, the presence of open fractures reduces the acoustic velocity. Fractures can be closed by application of external forces and measured velocity can be increased as a result. Such pressure changes have been used to characterize cracks and their orientation in laboratory samples. See, for example, the paper entitled "Characterization of Oriented Cracks with Differential Strain Analysis", Journal of Geophysical Research, Volume 83, No. B3, Mar. 10, 1978 of which the Applicant is a co-author. In the experiments described in that paper, external forces were applied to samples to progressively close the microcracks while the increases in elastic moduli were used to determine closure of the microcracks.

The present invention is directed towards measurement of fracturing in the rock forming earth formations in situ. Such rock is at the time of measurement subject to the natural overburden and tectonic stresses. It is not possible to apply forces in the same way as is normally done with laboratory rock samples. The natural overburden forces tend to at least partially close the naturally occurring or induced microcracks or fractures. In the present invention, after making initial measurements, borehole pressure is increased in steps and the measurements are repeated. The increasing borehole pressure counteracts overburden and tectonic stresses allowing fractures or microcracks to open, thus reducing measured acoustic velocity and indicating the presence of fracturing.

Figure 1:
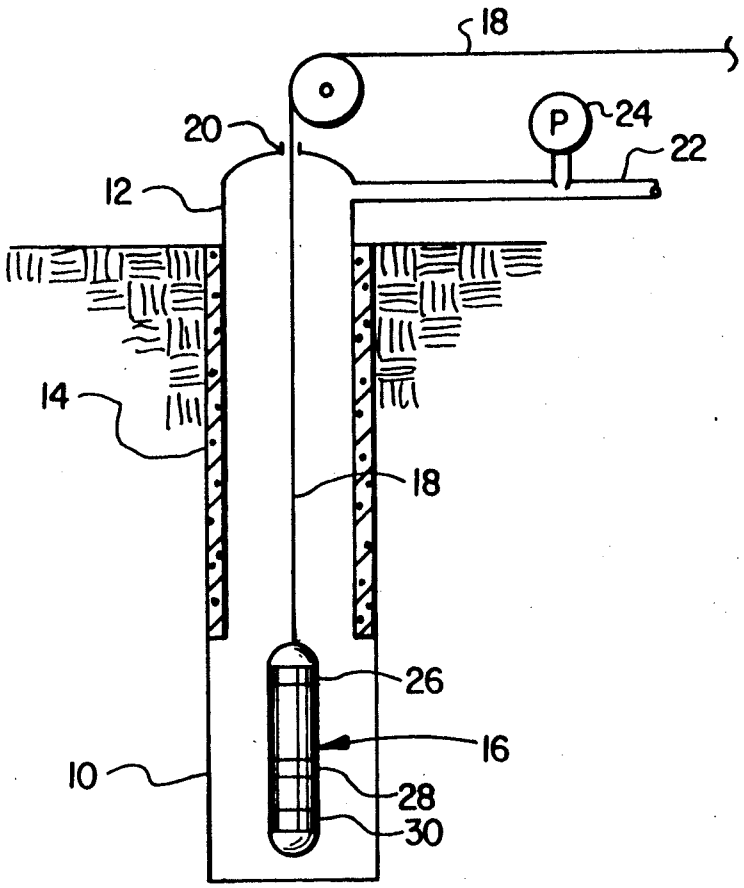
FIG. 1 is a cross section illustration of a partially cased borehole with a sonic logging tool in place for use in the method of the present invention.

With reference to FIG. 1, a typical arrangement for practice of the present invention is illustrated. In FIG. 1, a borehole 10 is open at its lower end, but has surface casing 12 installed at its upper end. The casing is sealed in place by cement 14. A conventional sonic logging tool 16 is suspended in the open hole portion on a conventional wireline 18 extending through a pressure seal 20 to conventional control and recording equipment at the earth's surface. A conduit 22 is connected to casing 12 for pressurizing borehole 10. A gauge 24 is provided for measuring borehole pressure at the surface location. Pressure at the location of logging tool 16 must, of course, be adjusted for the weight of drilling fluid within borehole 10.

As illustrated, sonic logging tool 16 is a conventional pressure wave device, having a transmitting transducer 26 on its upper end and a pair of receiving transducers 28 and 30 on its lower end. Acoustic pulses generated by transducer 26 pass through borehole fluid into the wall of borehole 10 and are detected by transducers 28 and 30 as they pass by the lower end of tool 16. The time delay between receipt of the signal at transducers 28 and 30 and the known distance between the transducers is used to determine acoustic velocity. In a typical logging operation, the acoustic tool 16 is slowly moved through the borehole 10 while repetitive measurements of acoustic velocity are made and recorded.

The velocity measurements are plotted versus depth from the surface to generate a velocity log. The first step of the present invention is to make such a conventional measurement at least at the depths of interest. After the initial run, the pressure within borehole 10 is increased by application of an appropriate fluid through conduit 22. The velocity logging run is then repeated to generate a second velocity log. The two velocity logs can be compared to determine areas where significant increases in acoustic velocity occur. Such increases would indicate the presence of fracturing or microcracks. The pressure may be again increased and the logging run repeated a number of times. The limiting value of borehole pressure would be the formation breakdown pressure, at which new hydraulic fractures are induced in the formation.

While borehole 10 is illustrated as being uncased or in open hole condition at the lower end where measurements are taken, it is possible to practice the present invention in cased borehole sections which have been perforated. The perforations will allow the fluids within the borehole to flow into and increase the formation pressures at least in the fractured zones.

Figure 2:
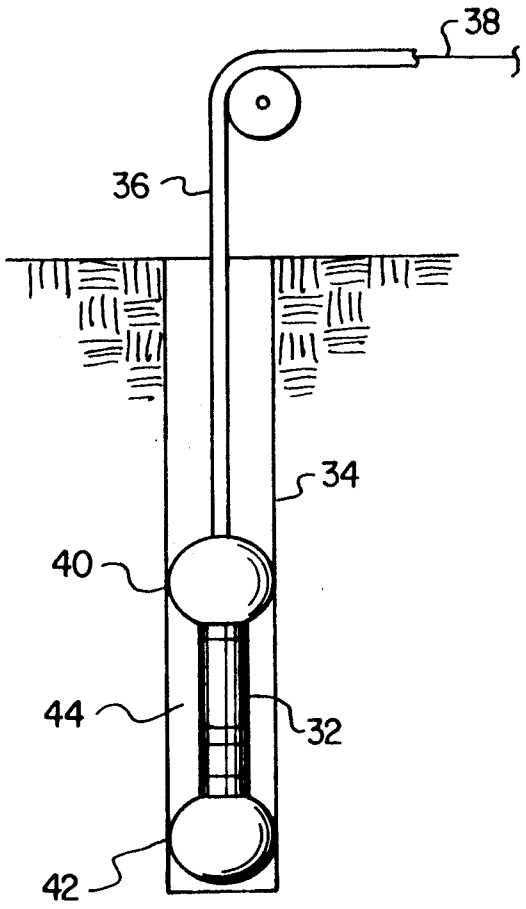
FIG. 2 is a cross section illustration of an open borehole with a sonic logging tool supported by coiled tubing for use in the method of the present invention.

With reference to FIG. 2, there is illustrated apparatus which would allow practice of the present invention in an open borehole with no casing installed. In FIG. 2, the logging tool 32 is supported within open borehole 34 by coiled tubing 36. A conventional wireline 38 extends through coiled tubing 36 for providing control and recording functions to the logging device 32. Logging tool 32 is provided at its upper and lower ends with packers 40 and 42 to isolate a portion 44 of the borehole 34. Pressure within portion 44 can be adjusted by application of fluids through the coiled tubing 36. Packers 40 and 42 may likewise be inflated and deflated by application of the fluids through the coiled tubing 36. In the embodiment of FIG. 2, measurements must be taken while the logging tool 32 is stationary since packers 40 and 42 must be sealed in place to allow application of pressure to zone 44. In this embodiment it is preferred to leave the tool 32 at a single location while alternately measuring velocity and increasing pressure within zone 44 in small steps. In this way a plot of velocity versus pressure may be produced for each station or depth at which logging tool 32 is operated. Such measurements can be converted to a conventional log if desired.

The conventional logging tool illustrated in FIGS. 1 and 2, uses pressure waves traveling down the borehole to measure formation velocity. The velocity of such waves is affected by generally horizontal fractures, but would be substantially unaffected by vertically oriented fractures. Such vertically oriented fractures may be detected by use of a shear wave logging tool such as that taught by U.S. Pat. No. 4,794,572 issued to Sondergeld, et al. on Dec. 27, 1988. This patent is hereby incorporated by reference for all purposes. It is preferred that at least two shear wave transmitters and receiver sets operating with different orientations be employed so that formation anisotropy and the azimuthal orientation of vertical fractures can be determined. The equipment and methods for making such determinations are described in the above-referenced patent. It is further preferred that a logging tool 16 or 32 include both pressure wave transducers and shear wave transducers so that fractures having any orientation may be detected.

While the above description of preferred embodiments are based on measurement of sonic velocity in the formation, other acoustic properties may also be used to determine the presence of fracturing in the method of the present invention. As taught in the above referenced patent, the amplitudes and phase shifts of the sonic waveforms may also be measured to determine formation properties. Such properties can also be used to indicate wave splitting caused by formation anisotropy. Differences in any of these acoustic properties which result from changes in pressure are useful in characterizing fracturing in the present invention.

All of these conventional sonic logging tools and their methods of operation effectively evaluate a large volume of rock relative to previous image logging techniques. For example, borehole televiewer devices essentially see only the surface of the borehole. Microfractures which are too small to be seen by such image logging devices will still be detected by velocity measurement devices. The method of the present invention therefore provides a better characterization of the bulk of the formation being investigated.

While the present invention has been described and illustrated with reference to particular apparatus and methods of use, various modifications can be made therein without departing from the scope of the invention as defined by the following claims.

What is claimed is:

1. A method for evaluating fractures in an earth formation surrounding a borehole, comprising:

using a sonic logging tool in a borehole to measure a first acoustic property of an earth formation surrounding a borehole at a first pressure, said logging tool having at least one transducer for generating an acoustic signal and at least one transducer for receiving the acoustic signal after it has passed through at least a portion of the formation surrounding the borehole;

changing the pressure in said borehole adjacent said earth formation;

using said sonic logging tool in said borehole to measure a second acoustic property of said earth formation after said pressure change; and, comparing said first and second measurements to determine the amount of fracturing present in said earth formation.

2. The method of claim 1 further including, changing the pressure in said borehole adjacent said earth formation a second time;

using said sonic logging tool in said borehole to measure a third acoustic property after said second pressure change; and comparing said third measurement with said first and second measurements to determine the amount of fracturing present in said earth formation.

3. The method of claims 1 or 2 wherein the acoustic property measured is sonic velocity.

4. The method of claim 1 wherein said logging tool generates pressure waves.

5. The method of claim 1 wherein said logging tool generates shear waves.

6. The method of claim 5 wherein said logging tool generates shear waves having two orthogonal polarizations, whereby differences in measured velocities indicates anisotropy in said formation.

* * * * *